(No Model.) 2 Sheets—Sheet 2.
A. J. LLOYD.
INSTRUMENT FOR TESTING LENSES.
No. 585,390. Patented June 29, 1897.
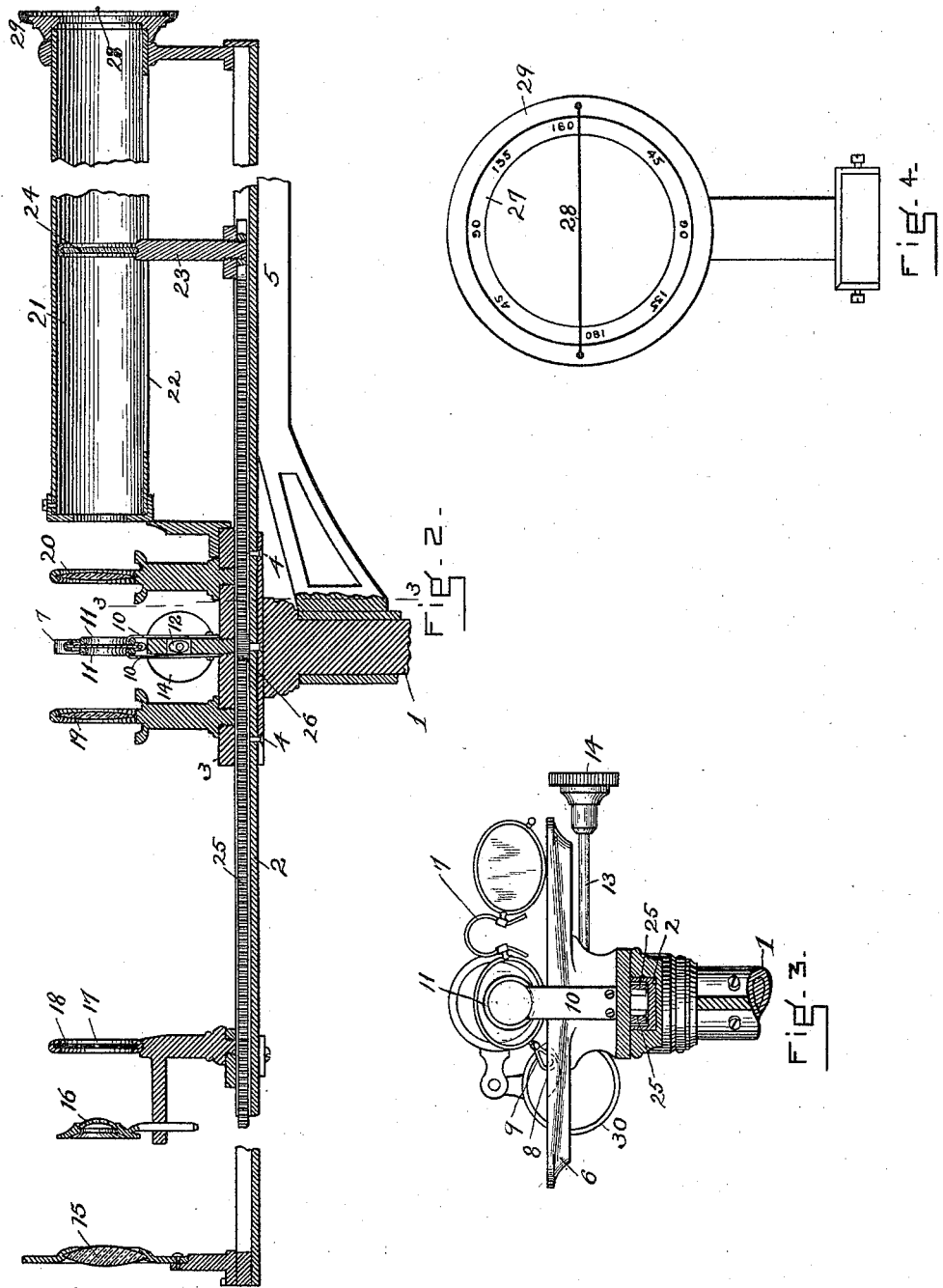
WITNESSES
Everett D. Chadwick.
Ellen B. Tomlinson.
INVENTOR
Andrew J. Lloyd
by Alex. P. Browne,
attorney

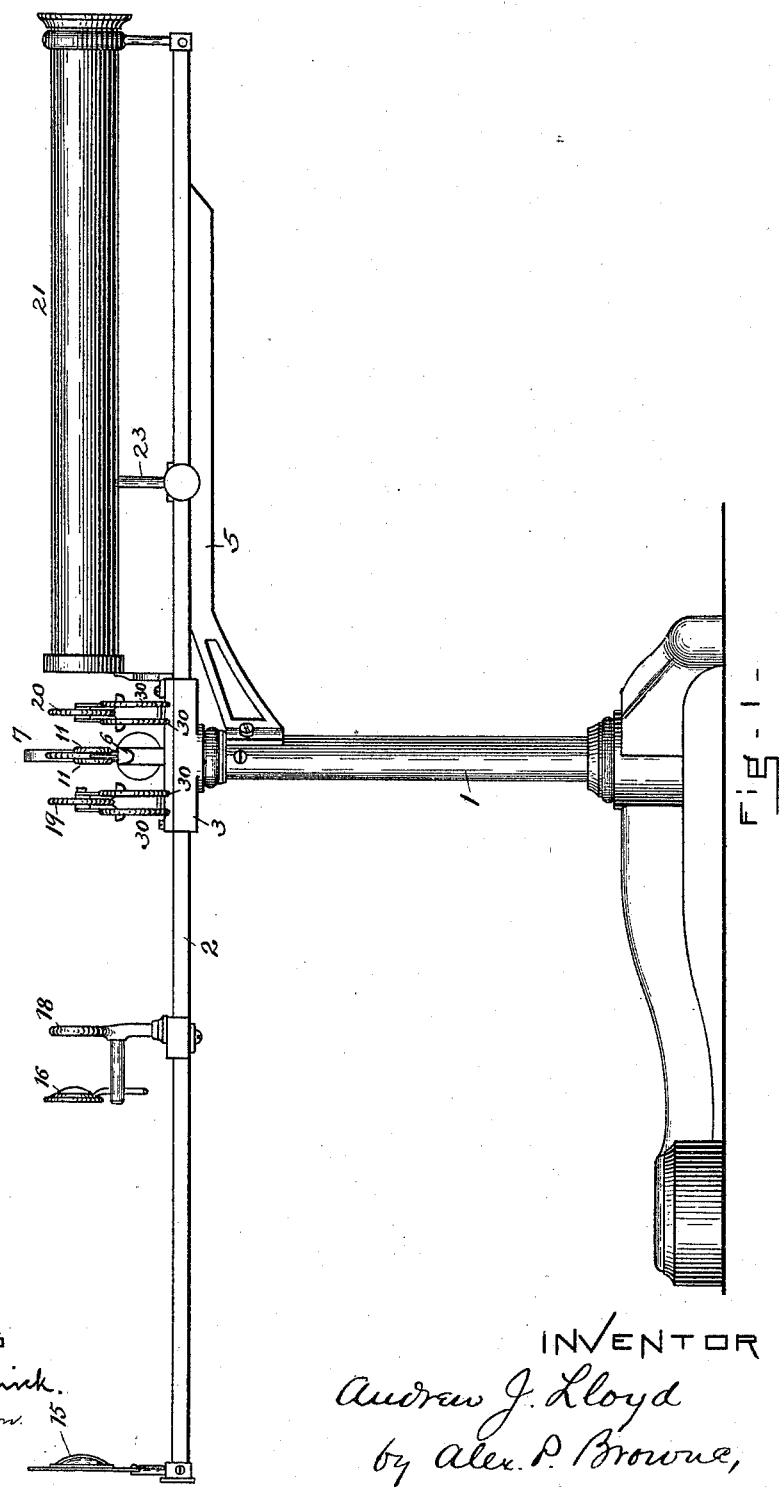

UNITED STATES PATENT OFFICE.

ANDREW J. LLOYD, OF WAKEFIELD, MASSACHUSETTS.

INSTRUMENT FOR TESTING LENSES.

SPECIFICATION forming part of Letters Patent No. 585,390, dated June 29, 1897.

Application filed February 8, 1897. Serial No. 622,415. (No model.)

*To all whom it may concern:*

Be it known that I, ANDREW J. LLOYD, a citizen of Great Britain, residing at Wakefield, in the county of Middlesex and State of Massachusetts, have invented certain new and useful Improvements in Instruments for Testing Lenses, of which the following is a specification.

My invention relates to devices for testing lenses, and is more especially intended to provide an efficient instrument for quickly and accurately determining the angle which the axis of a cylindrically-ground lens makes with the axis of the eyeglass or spectacle frame in which it is mounted.

I have shown in the accompanying drawings a preferred form of my invention, Figure 1 being a side elevation of a complete instrument; Fig. 2, a central vertical longitudinal section thereof, the standard being omitted; Fig. 3, a cross-section taken on the line 3 3 of Fig. 2, and Fig. 4 an end view of the reading end of the instrument.

The important features of my device comprise a support on which the lens to be tested is secured in a certain fixed relation to the instrument, means for transmitting rays of light through the lens and converging them to a focus upon a suitable screen, and a device for measuring the position of the image thus produced at the focus. As shown in the drawings, these parts are constructed and arranged as follows:

The numeral 1 indicates a standard, on the top of which a beam 2 is supported. This beam 2 may be passed through an open-ended box-like structure 3 and secured thereto by means of screws 4, the box 3 being rigidly fixed in the top of the standard 1. If desired, the rigidity of the beam 2 may be increased by a brace, such as 5. To the top of the box 3 is rigidly secured a transversely-extending support 6, on which a lens rests while being tested. This support 6 is made of such length that the entire frame of a pair of eyeglasses or spectacles 7 may rest upon it, the axis of the frame of the lens being thus kept parallel to the top surface of the support 6. A recess 8 should be provided in the upper face of this support 6 for the reception of the thumbpiece 9, usually attached to eyeglass-frames. The lens being tested is held in place in a vertical position on the support 6 by a suitable clamping device, which may consist of spring-plates 10, attached to the sides of the support 6 and provided each with a clamping-ring 11 at its upper end. The parts 11 are made in the form of rings in order to obstruct as little as possible the passage of rays of light through the lens. The plates 10 may be separated when it is desired to insert or withdraw a lens by means of a double cam 12, located between them on the end of a shaft 13, journaled in the base of the support 6 and adapted to be turned by a thumb-screw 14.

For the purpose of passing rays of light through the lens to be tested I locate the source of light (not shown) at the left-hand end of the instrument, as shown in Figs. 1 and 2, and pass the rays thereof first through a condensing-lens 15, supported upon one end of the beam 2, the purpose of which is to converge said rays until they are practically parallel. They next pass through another condensing-lens 16, which focuses them at a very small aperture 17 in an opaque diaphragm 18. Then the rays pass through a system of condensing-lenses comprising the lenses 19 and 20, located in fixed positions on opposite sides of the support 6.

Of course when a lens is being tested with my instrument the rays of light pass through it also in passing from the lens 19 to the lens 20. The effect of these lenses 19 and 20 is to converge the rays of light to a focus, which if there is no lens being tested in the apparatus will be located at a point slightly beyond the extreme right-hand end of the instrument. When, however, a plus or convex lens is placed in the position for testing, the focal distance of the system is shortened and the focus will be located somewhere within the telescopic tube 21, which is supported on the right-hand half of the beam 2. This telescope 21 is open at both ends and is provided with a longitudinal slot 22 along its bottom, a support 23 being passed up through this slot and provided at its upper end with a circular ground-glass screen 24. In order that this screen 24 may be brought to the focus of the system of lenses in any particular case, it is made to slide along the beam 2. I prefer to also make the diaphragm 18 and the lens 16 adjustable along the beam 2 and to so connect the sliding clip which supports these parts with the support 23 that the movement of either will actuate the other to the same extent in the opposite direction, so that they will always be equidistant from the support 6. A convenient means of producing this result consists in attaching to each of these supports a rack 25, each rack being meshed with a pinion 26, journaled at any convenient point—as, for instance, in the top of the standard 1. These racks of course face each other and the pinion is located between them, the top of the beam 2 being preferably hollowed out to receive these parts and conceal them from view.

On the right-hand end of the telescope 21 is located a fixed ring 27, graduated into degrees, as shown in Fig. 4. A diametrical wire 28 is located over the ring 27 in such manner that it may be moved through any desired angle—as, for instance, by being attached to a ring 29, arranged to turn on the end of the telescope. The graduated ring 27 is so located that a line joining its zero-point with its one-hundred-and-eighty-degree mark will be parallel with the top of the support 6.

In using my instrument the lens to be tested is secured between the rings 11 in the manner previously described and rays of light are made to pass through it. Supposing the lens to be a plus or convex lens, the rays of light will be converged to a focus at some point within the telescopic tube 21, and the screen 24 is moved along by hand until said focus falls upon it.

The image produced at the focus of a cylindrically-ground lens is a straight line of light, the direction of which is parallel to the axis of the cylinder on which the lens is ground. The observer stands at the right-hand end of the instrument and looking toward the screen 24 turns the wire 28 until it coincides in direction with the line of light shown on said screen. The angle through which the wire 28 has been drawn is then read on the scale 27, and as the zero-line of said scale is parallel with the top of the support 6, and hence with the axis of the frame of the eyeglasses or spectacles being tested, the position of the wire 28 will give the angle at which the lens is set in its frame.

It of course frequently happens that the lens to be tested is a negative or concave lens, in which case its dispersive effect must be sufficiently overcome by supplemental convex lenses 30, one or more of which may be hinged to either or both of the standards carrying the lenses 19 and 20, in such manner as to be conveniently swung into or out of position, as indicated in Fig. 3. One effect of using these lenses with the concave lens to be tested is to rotate the line formed at the focus through a right angle, and this of course is to be allowed for in calculating the inclination of the axis of the lens.

I do not consider my invention to be limited to the details of construction which I have shown and described, as very many changes may be made therein without departing from the spirit of my invention.

I claim—

1. In an apparatus for testing lenses, a holder for the lens to be tested, means for concentrating rays of light on said lens, a screen on which said rays are focused after passing through the lens, and means for measuring the angular position of the image produced on said screen, all substantially as described.

2. In a device for testing lenses, a support and clamp for holding the frame of the lens to be tested in a fixed relation to the instrument, means for concentrating rays of light upon said lens, a screen upon which said rays are focused after passing through said lens, a graduated scale, and a wire arranged to be rotated over said scale into correspondence with the position of the focal image, all substantially as described.

3. In a device for testing lenses, a support for the lens to be tested, means for clamping said lens in position on the support, means for concentrating rays of light upon said lens and focusing them within a telescopic tube, a screen adjustable within said tube toward and from said lens, and mechanism for measuring the angular position of the focal image falling upon the said screen, all substantially as described.

4. In a device for testing lenses, a support for the lens to be tested, means for clamping said lens in position thereon, a telescopic tube provided at one end with a graduated ring, the zero-line whereof is parallel with the top of the lens-support, a diametrical wire movable over said graduated ring, a screen adjustable longitudinally within said telescopic tube, and means for transmitting rays of light through the lens to be tested and focusing them upon the said screen, all substantially as described.

In testimony whereof I have hereunto subscribed my name this 3d day of February, A. D. 1897.

ANDREW J. LLOYD.

Witnesses:
BERNHARDT KLEIN,
EVERETT D. CHADWICK.